Aug. 11, 1931.   C. M. F. FRIDEN   1,818,548
CALCULATING MACHINE
Filed Aug. 19, 1924   3 Sheets-Sheet 3
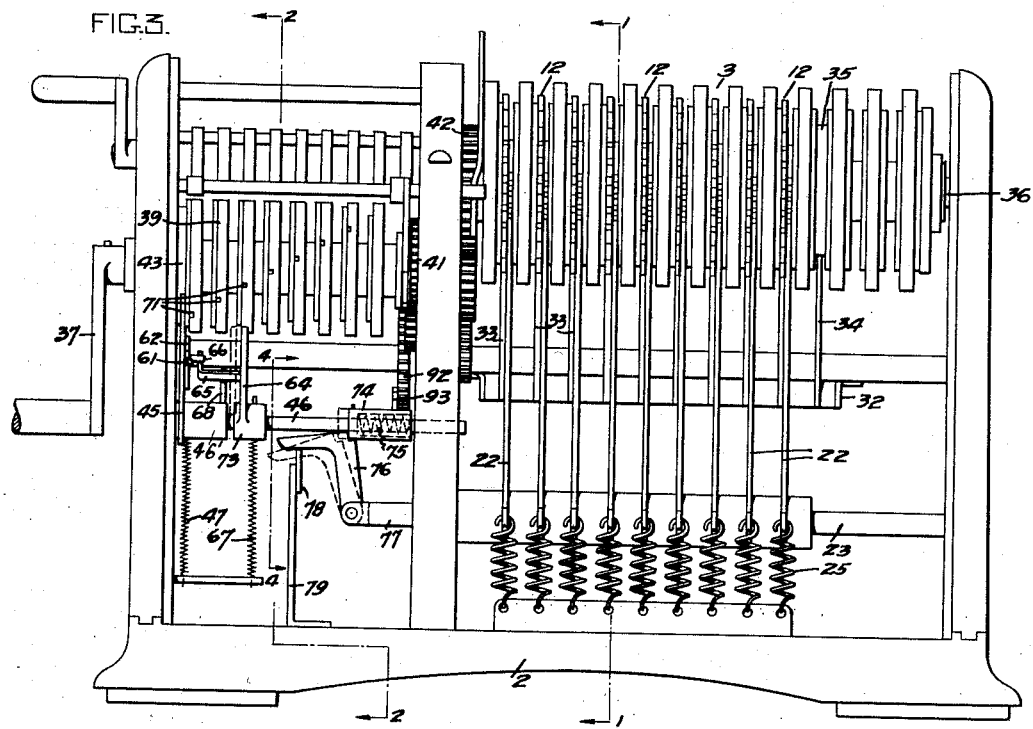
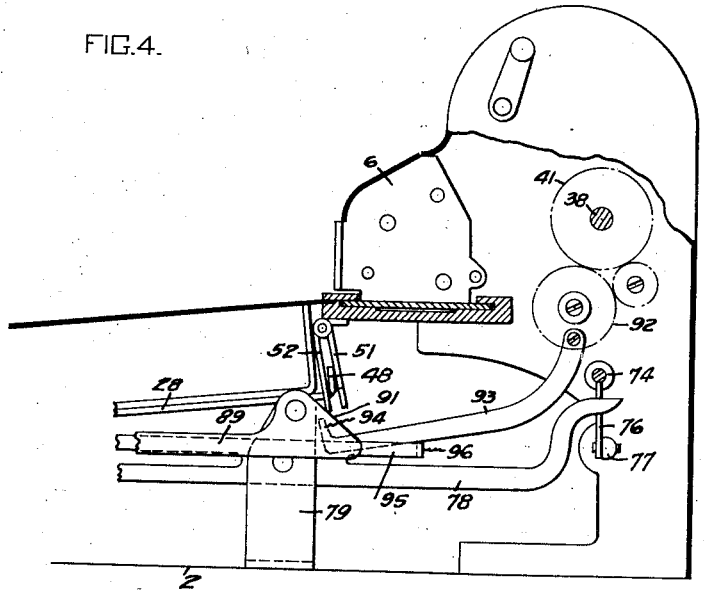
INVENTOR
CARL M. F. FRIDEN.
BY
HIS ATTORNEYS.

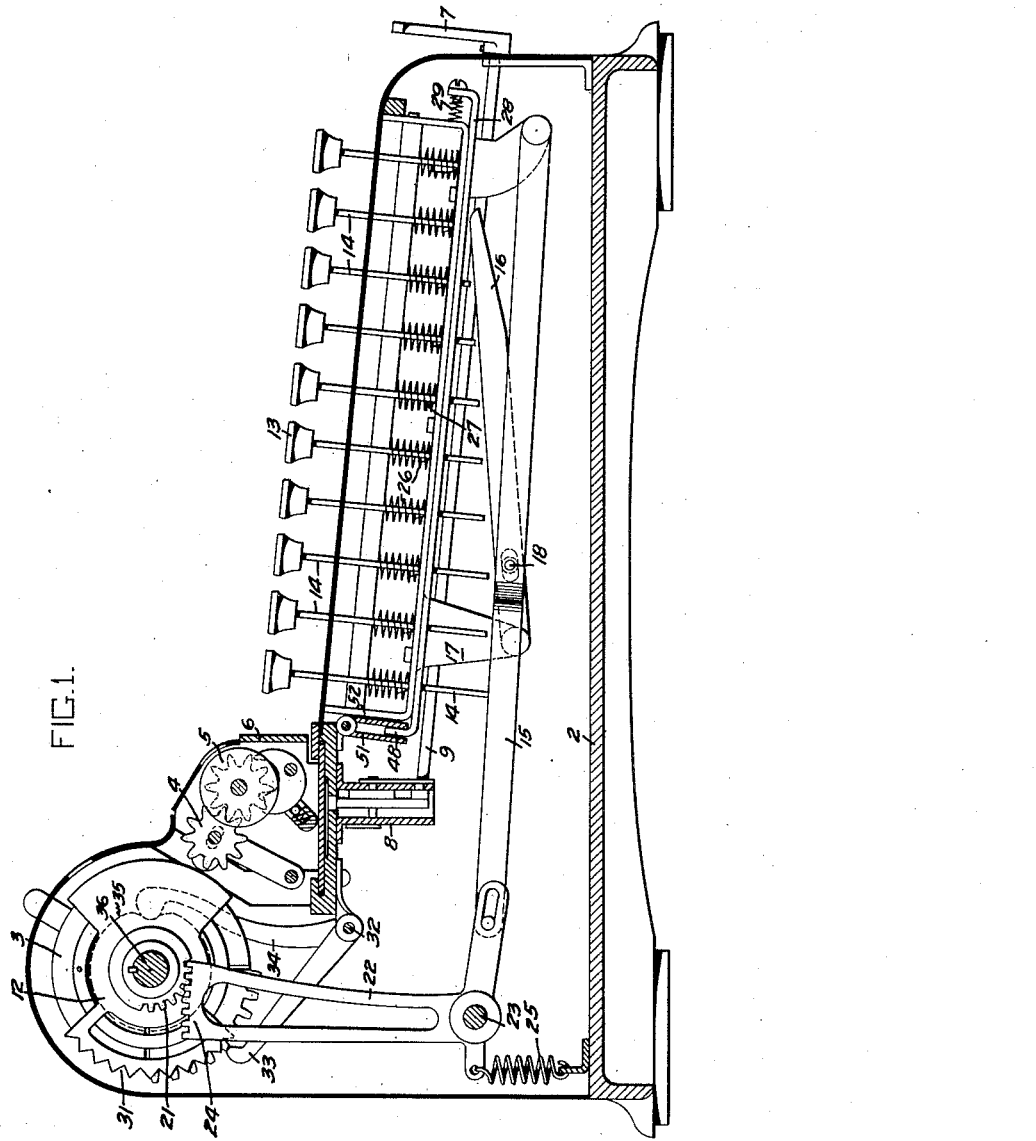

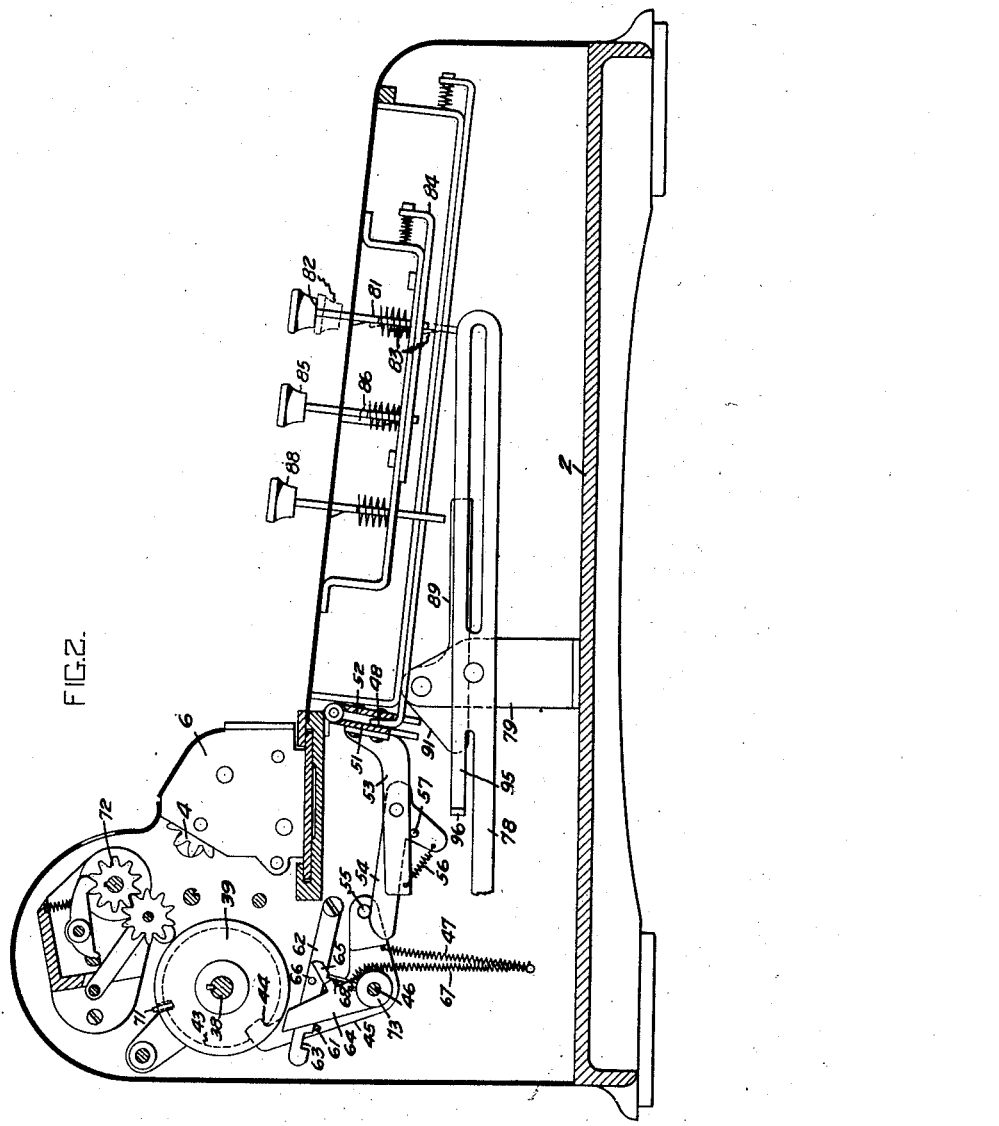

Patented Aug. 11, 1931

1,818,548

UNITED STATES PATENT OFFICE

CARL M. F. FRIDEN, OF OAKLAND, CALIFORNIA, ASSIGNOR TO MARCHANT CALCULATING MACHINE COMPANY, OF EMERYVILLE, CALIFORNIA, A CORPORATION OF CALIFORNIA

CALCULATING MACHINE

Application filed August 19, 1924. Serial No. 732,945.

The invention relates to calculating machines and particularly to calculating machines which are operated by the movement of a crank from neutral position through a circle and back to neutral position. The invention is particularly adapted for use in connection with the calculating machine shown in my copending application Serial No. 539,422, filed February 27, 1922, but it is to be understood that the invention is not limited to use in connection with the calculating machine disclosed in my prior application.

Machines of the type disclosed in my prior application are operated by means of a hand crank which is movable from neutral position through a circle and back to neutral position. Machines of this type have been provided with means for locking the handle in neutral position and this means has heretofore usually comprised a handle pin which was movable transversely with respect to the plane of rotation of the handle, to operate devices for either clearing the keyboard or clearing the calculating mechanism. The handle pin which was carried by the handle must be alined with and dropped into a socket disposed at the neutral position of the handle in order to operate the clearing devices but this handle pin, on account of the necessity of accurately alining it with the socket and dropping it into the socket, and the necessity of holding the handle pin out and away from the socket when it is desired to rotate the crank a number of times, as in multiplication, is objectionable to users of the machine, and it is one of the objects of the present invention to eliminate the handle pin.

Another object of the invention is to provide means independent of the release of the parts of the calculating mechanism, for locking the crank in neutral position.

A further object of the invention is to provide a calculating machine in which the operating member is normally locked in neutral position and in which the introduction of a value into the calculating mechanism operates to release the locking means on the operating member.

A further object of the invention is to provide a locking means for the operating member and means for disabling said locking means, so that the operating member may be rotated a plurality of times, as when performing the operation of multiplication, without causing the locking means to operate to lock the operating member in neutral position.

The invention possesses other advantageous features, some of which with the foregoing, will be set forth at length in the following description where I shall outline in full that form of my invention which I have selected for illustration in the drawings accompanying and forming part of the present specification. In said drawings I have shown one form of apparatus embodying my invention, but it is to be understood that I do not limit myself to such form, since the invention, as set forth in the claims, may be embodied in a plurality of forms. In the drawings I have shown the invention embodied in the calculating machine disclosed in my prior application but it is to be understood that the present invention is not limited to use in connection with said prior calculating machine but may be used in connection with any calculating machine in which its functions are desirable.

Referring to said drawings:

Figure 1 is a longitudinal vertical section through a keyboard calculating machine embodying my invention. The section is taken on the line 1—1 Figure 3.

Figure 2 is a longitudinal vertical section through the same calculating machine, the section being taken in a different vertical plane, to disclose other features of the apparatus of my invention. The section is taken on the line 2—2 Figure 3.

Figure 3 is a rear elevation of the calculating machine of my invention, with the cover removed.

Figure 4 is a detail of the mechanism of the machine taken on the line 4—4 Figure 3.

The invention relates to calculating machines of the type embodying a rotatable calculating mechanism which, during its rotation, is effective on a counting mechanism to effect the calculation. In the present instance I have shown the invention embodied in a machine of the keyboard type in which the values are introduced into the calculating mechanism actuator by keys, such machine being fully disclosed in my copending U. S. application above referred to and in the corresponding Letters Patent of France No. 556,420 of September 21, 1922, to which reference is hereby made for a disclosure of the complete machine. Depression of a key introduces a value, corresponding to the numeral on the key, into a rotatable actuator within the machine, (see U. S. Patent No. 1,524,924 of February 3, 1925) rotation of the actuator being effected by a crank or handle which projects to the outside of the machine. The values introduced into the actuator are transmitted, on the rotation of the crank handle, to the figure disc of the counter mechanism which, for the purpose of making the direct action of the selected values on the figure disc of highest value possible, is disposed in parallel displaceable relation to the axis of the actuator.

The values are introduced into the machine while the crank handle is in neutral position and means are provided for locking the crank handle in such position. The crank handle is directly connected to the actuator and the initial rotation of the handle operates to lock the elements of the actuator in adjusted position, such adjusted position being effected by the depression of the value keys. The actuator remains locked in adjusted position, while the crank handle is out of neutral position, so that values may not be accidentally entered into the machine while the parts thereof are not in neutral position. In performing operations of addition, the crank handle locking means is effective to lock the crank handle each time that it reaches the neutral position and the values are cleared from the actuator when the crank handle reaches the neutral position, so that the machine is ready to receive the figures of the next amount to be added. The machine may also be used for solving problems in multiplication and division, which problems require a plurality of rotations of the crank handle, and means are provided for disabling the crank handle locking means, so that the crank handle may be moved through the neutral position a plurality of times. The machine comprises a calculating mechanism actuator, means for introducing values into the actuator, means for rotating the actuator to make the introduced values effective on the counting mechanism, and means for locking the actuator in neutral position.

The machine comprises a suitable base 2 upon which the various elements of the mechanism are mounted. The counting mechanism actuator 3 is preferably mounted in the upper portion of the machine and, on rotation of the actuator 3, the actuating elements thereon engage the intermediate wheel 4 of the counting mechanism 5, which is mounted on the longitudinally movable carriage 6. The carriage is shifted longitudinally by means of the lever 7 which is arranged at the front of the machine and which is connected to suitable carriage shifting mechanism 8 by the rod 9. The actuator and the carriage shifting mechanism are fully disclosed in my prior application above identified. The actuator includes a plurality of value selecting discs 12, each disc being associated with a row of value keys 13. The stems 14 of the keys are operatively associated with a duplex lever comprising the main lever 15 pivoted to a fixed support at the front of the machine and a supplementary lever 16 pivoted to a fixed support 17 adjacent the center of the machine and fulcrumed at 18 to the main lever 15. Several of the key stems 14 cooperate directly with the main lever 15 and other of the key stems 14 cooperate with the supplementary lever 16, depression of any of the keys in a bank serving to move the value selecting disc 12 through an arc corresponding to the value of the keys. Each value selecting disc 12 is provided with a gear 21 which is connected to the main lever 15 by the bell crank lever 22 pivoted on a fixed axis 23 and provided on its upper end with a rack 24 in engagement with the gear 21. The value selecting discs 12 are normally held in zero position and are returned to zero position from adjusted positions by the springs 25 connected to the bell crank levers 22. It is understood that there is a plurality of units forming the calculating and selecting mechanisms, each unit comprising a disc 12, a bell crank lever 22, an actuating lever 15 and a row of keys 13.

The keys are normally held in elevated position by springs 26 associated with the key stems and means are provided for holding the depressed key temporarily in depressed position. Each key stem 14 is provided with a cam shoulder 27 and the key stems extend through apertures in the slide bar 28, there being one slide bar for each row of keys. The slide bar is normally held forward by the spring 29, and when a key is depressed, the cam 27 slides the bar 28 backward and then the bar 28 moves forward, with the shoulder of the cam 27 in engagement with the under side of the bar, thus holding the keys in depressed position. The slide bar 28 moves backward each time a key is depressed.

The depression of a key causes the value selecting disc 12 to be set in adjusted position and such disc is initially held in such position by virtue of the fact that the depressed key is held in depressed position. Other means, operative upon the operation of the calculating mechanism, are effective to lock the disc 12 in adjusted position, so that the depressed key may be released to clear the keyboard and permit the introduction of other values for the next operation of the machine. Each disc 12 is provided with an arcuate rack 31 and means are provided for engaging this rack to lock the disc 12 in adjusted position. Secured to the shaft 32, journalled within the machine, are a plurality of detents 33, one for each rack 31. Secured to the shaft 32 is a finger 34, the upper end of which is in engagement with a cam 35 forming part of the calculating drum and secured to the drum shaft 36. The cam 35 has one low spot and, when the calculating drum is in neutral position, the arm 34 engages the low spot, positioning the detents 33 in spaced relation with respect to the racks 31. Upon initial rotation of the shaft 36 the low spot on the cam 35 moves out from under the end of the arm 34, causing the arm 34 to move, thus rocking the shaft 32 and bringing the detents 33 into engagement with the arcuate racks 31, to lock the selecting discs in adjusted position. The discs are held in such position by the detents 33 during substantially the complete rotation of the shaft 36, and, when the actuator returns to neutral position, after completing its rotation, the detents 33 are released from engagement with the racks 31. When performing problems in addition, the selecting discs 12 return to neutral position, when the actuator is brought to neutral position, but in performing problems in multiplication, other means are provided for holding the discs 12 in adjusted position during a plurality of rotations of the actuator 3.

The shaft 36 and the actuator 3, which is secured thereto, are rotatable by any suitable means, such as the crank handle 37, which extends to the exterior of the casing. The crank handle is rotatable from neutral position through a circle and back to neutral position to perform a calculating operation. In the present construction, the crank handle 37 is connected to the drum 39 through a train of gears, as set forth in my prior application above identified, so that the actuator may rotate in the same or the opposite direction to the direction of rotation of the crank handle. The crank handle is fixed to a shaft 38, which extends through the hollow shaft of the revolutions counting drum 39 and secured to the shaft 38 beyond the drum 39 is a gear 41 which is connected through a train of gears with the gear 42 which is secured to the shaft 36 of the calculating drum.

Means are provided for locking the crankhandle 37 in neutral position and for releasing said crank handle when it is desirable to operate the calculating mechanism. Depression of one of the value keys 13 on the keyboard, serves to unlock the crank handle so that it may be rotated and further means are provided for releasing the locking means to again lock the crank handle when it reaches neutral position or to hold the locking means out of engagement with the crank handle, so that the crank handle may be given a plurality of rotations. When the machine is being used to perform operations in addition, the devices are set to cause the crank handle to be locked in neutral position each time the crank handle reaches neutral position and, when operations of multiplication or division are being performed, means are provided for holding the locking means out of engagement, so that the crank handle may be rotated a plurality of times and may be moved through the neutral position a plurality of times without being locked in such position.

Secured to the drive shaft 38 is a disc 43 having a depression 44 in its periphery, which is adapted to be engaged by the locking means or latch 45 when the crank handle is in neutral position. The latch 45, in the present instance, comprises a bell crank lever journalled on bushing 46' into which the shaft 46 extends and normally held in engagement with the cam disc 43 by the spring 47. The bushing 46' is secured to the side plate of the machine.

Means are provided for moving the latch 45 out of engagement with the disc 43 upon the depression of a key 13. As has been pointed out before, depression of a key 13 causes longitudinal movement of the associated slide bar 28. Each slide bar is provided on its rear end with a nose 48 which is disposed between the two swing plates 51 and 52, the former being movable independently of the latter. Depression of a key 13 causes movement of the swing plate 51, and movement of the swing plate 52 causes longitudinal movement of the slide bar 28 for the purpose of releasing the depressed key. Secured to the swing plate 51, which swing plate is associated with all of the rows of value keys 13, is an arm 53 on which is pivoted a lever 54 which cooperates with a pin 55 on the latch lever 45. The lever 54 is normally pressed upward into contact with the pin 55 by the spring 56 and the upward movement of the lever 54, with respect to the arm 53, is limited by the stop pin 57 secured to the lever 54 and bearing against the under side of the arm 53. The lever 54 serves as a lost motion device between the pin 55 and the arm 53, since the swinging movement of the swing plate 51 varies under different circumstances. The swing plate 51 must necessarily move when the swing plate 52 is moved, and the angle of movement of the swing plate 51, due to the depression of a key 13, is less than the angular movement of the swing plate 51, which is caused by the angular movement of the swing plate 52 to release the depressed key. In order to insure the release of the depressed keys, the slides 28 are moved a greater distance when this operation is performed, than they are by the depression of one of the keys. If the lever 45 was moved this greater distance it is possible that on its return throw, the pin 61 might strike the latch 62 too hard a blow and thus cause the latch to be tripped as will be apparent later. For this reason, therefore, that is, to cause the same movement of the lever 45 for movement of either swing plate, a lost motion device is desirable between the arm 53 and the pin 55. It is apparent therefore that when a key 13 is depressed, the latch 45 is moved out of engagement with the disc 43, thus permitting the crank handle to be rotated.

Means are provided for holding the latch out of engagement with the disc 43 and for selectively releasing the latch to permit it to again lock the crank handle in neutral position. The latch lever 45 is provided with a pin 61 which is adapted to be engaged by the secondary latch 62 when the latch 45 is moved from engagement with the disc 43. The secondary latch 62 is provided with a notch 63 which drops over the pin 61, thus holding the latch 45 released from the disc 43.

Means are provided for disengaging the secondary latch 62 from the latch 45 for each rotation of the crank handle, when the mechanism is set to perform problems in addition or subtraction. Secured to the shaft 46 is a lever 64 having a laterally extending arm 65 which is disposed under a pin 66 on the secondary latch lever 62. The lever 64 is normally held in retracted position, with the arm 65 spaced below the pin 66 by the spring 67 and further retracted movement of the lever 64 is prevented by the stop pin 68. When a key 13 is depressed, the lever 45 is moved out of the notch in the disc 43, and the latch 62 drops over the pin 61, bringing the pin 66 into approximate contact with the arm 65. The revolutions counting drum 39 is provided with a plurality of tens-carrying pins 71 which, on rotation of the revolutions counting drum, are effective upon the revolutions counter 72. When the mechanism is set to perform problems in addition or subtraction, the upper end of the lever 64 lies in the path of one of the tens-carrying pins 71 of the revolutions counting drum 39, so that on rotation of the drum 39, the pin 71 contacts with the upper end of the lever 64 and rocks said lever to bring the arm 65 into engagement with the pin 66 and lift the secondary latch 62 to release the latch lever 45. I have employed the tens-carrying pin 71 of the revolutions counting mechanism to release the latch upon the rotation of the crank handle, but it is to be understood that any other rotating element of the device may be used instead of the pin 71, this pin being used in this instance merely on account of the design of the calculating machine and the necessity of fitting the crank handle locking means into the space provided in the machine.

The lever 64 is provided with a hub 73 which is secured to the shaft 46 and means are provided for moving the shaft 46 longitudinally, to move the upper end of the lever 64 into and out of the plane of its operating device, such device in the present instance being a tens-carrying pin 71 of the revolutions counting drum 39. The arm 65 of the lever 64, and the pin 66 on the secondary latch 62, are of such length that the arm and the pin cooperate in either of the longitudinally adjusted positions of the lever 64. The shaft 46 is slidable longitudinally in its bearings and secured to the shaft is a housing 74 within which there is a spring 75 which normally tends to move the arm 64 to the position indicated in the dotted lines in Figure 3, in which position, the upper end of the arm 64 will be out of the path of the pin 71. The shaft 46 is movable longitudinally by means of the bent lever 76 pivoted at one end to the bracket 77 and engaging the end of the housing 74. Disposed under the free end of the lever 76 is a bar 78, which when raised, moves the housing 74 and consequently the shaft 46 to the right, as shown in Figure 3, thus moving the lever 64 into the plane of rotation of the tens-carrying pin 71. The lever 78 is pivoted intermediate its ends to a bracket 79 disposed within the machine, and the other end of the lever 78 lies below the stem 81 of the controlling key 82 which controls the operation of the machine for solving problems in addition and subtraction. Depression of the key 82 causes the adjacent end of the lever 78 to be depressed, thus raising the opposite end of the lever 78 and consequently moving the lever 76 to move the shaft 46 to the right to position the lever 64 in the path of the pin 71. The stem 81 of the key 82 is provided with a shoulder 83 which engages under the slide bar 84, when the key 82 is depressed, thus holding said key in the depressed position and holding the lever 64 in the plane of rotation of the pin 71. The machine is also provided with a control key 85 for controlling operations in multiplication and division and the stem of this key is provided with a cam 86, which, when the key 85 is depressed, causes movement of the slide bar 84 to release the key 82 and thus permit the spring 75 to depress the inner end of the lever 78 and move the lever 64 into a plane which is spaced from the plane of rotation of the pin 71. Thus, when the key 82 is depressed the secondary latch 62 is released during each rotation of the crank handle, so that the latch 45 may drop into the notch 44 when the crank handle reaches neutral position. When the machine is set to perform operations in multiplication or division, the secondary latch 62 is not operated and the latch 45 is held out of engagement with the disc 43 during a plurality of rotations of the crank handle.

It is apparent that the keyboard and the actuator are cleared, when the machine is set to perform problems in addition and subtraction, at each complete revolution of the crank handle. A clearance key 88 is provided for clearing the keyboard and the actuator, when the machine is set for performing problems in multiplication and division. Pivoted to the bracket 79 is a lever 89, the end of which lies beneath the stem of the clearance key 88. At its other end the lever 89 is provided with a cam face 91 which lies directly below the swing plate 52, and depression of the key 88 swings the swing plate 52 to move all of the slide bars 28 to release the depressed keys 13.

Means are also provided for clearing the keyboard at each rotation of the crank handle, when the machine is set to perform operations in addition or subtraction. Connected to the gear 41 is a gear 92, to which is pivoted an arm 93 having a hooked end 94 which lies below the swing plate 52 and which, during the rotation of the crank handle, oscillates back and forth. The arm 93 may be positioned so that the hook 94 engages the swing plate 52 in its oscillation or clears the swing plate 52. The lever 78, which is operated by the control key 82, is provided with an arm 95 having a lateral extension 96 on its end, on which the arm 93 rides. When the control key 82 is depressed, the arm 95 and consequently the extension 96 thereon, is raised, raising the hook 94 so that its path of oscillation intercepts the lower end of the plate 52. Therefore, when the addition control key 82 is depressed, the keyboard is cleared at each rotation of the crank handle. When the multiplication control key 85 has been depressed, the lateral extension 96 of the arm 95 is lowered, so that the hook 94 will not engage the swing plate 52, so that the values introduced into the machine by the depression of the keys remain in the machine for a plurality of rotations of the crank handle.

The depressed keys are released prior to the tripping of the lever 64 by the tooth 71. Depression of a key 13 rocks the gate 51, which moves the two-piece arm 53—54, to rock the lever 45, moving the end thereof out of engagement with the disc 43, thus permitting rotation of the crank 37. The lever 45 is held in disengaged position by the latch 62. Depression of the key 82 moves the arm 78 and the lever 76 to position the tripping lever 64 in the path of the tooth 71 carried by the element 39, which rotates synchronously with the crank. During the rotation of the element 39, the tooth 71 rocks the trip lever 64, raising the latch 62 and releasing the lever 45 so that it springs back and engages in the recess in the disc 43, locking the crank in full cycle position at the end of one revolution.

I claim:

1. In a calculating machine, a counting mechanism actuator, means for introducing values into the actuator, a member for operating said actuator, said member being movable from neutral position through a circle and back to neutral position, a revolution counting mechanism, rotatable in time with said member, a tens-carrying pin on said revolution counting mechanism, means for latching said member in neutral position, means operative by the introduction of a value into the actuator for releasing said latch, means for holding said latch in released position and means adapted to be operated by said tens-carrying pin for releasing said latch holding means.

2. In a calculating machine, a counting mechanism actuator, means for introducing values into the actuator, a member for operating said actuator, said member being movable from neutral position through a circle and back to neutral position, a revolution counting mechanism rotatable in time with said member, a tens-carrying pin on said revolution counting mechanism means for latching said member in neutral position, means operative by the introduction of a value into the actuator for releasing said latch, a pawl for holding the latch in released position and a lever adapted to be moved by said tens-carrying pin during the rotation of the revolution counting mechanism, to release said pawl.

3. In a calculating machine, a counting mechanism actuator, means for introducing values into the actuator, a member for operating said actuator, said member being movable from neutral position through an arc and back to neutral position means for latching said member in neutral position, means operated by the introduction of a value into the actuator for removing the latch from engagement with the member, means for holding the latch in disengaged position means operating in time with the actuator adapted to trip the latch holding means and selecting means for moving the latch tripping means into operative relation with the means operative in time with the actuator.

4. In a calculating machine, a counting mechanism actuator, means for introducing values into the actuator, a member for operating said actuator, said member being movable from neutral position through an arc and back to neutral position, means for latching said member in neutral position, means operated by the introduction of a value into the actuator for removing the latch from engagement with the member, means for holding the latch in disengaged position, a lever for tripping said latch holding means, means rotatable in time with the actuator for actuating said lever and manually operable means for moving said lever into the path of said lever actuating means.

5. In a calculating machine, a rotatable counting mechanism actuator, means for introducing values into the actuator, means for locking the actuator in neutral position, means operative by the introduction of a value into the actuator for moving the locking means to inoperative position, means operative in time with the actuator adapted to release said locking means and selecting means for controlling the release of the locking means by said releasing means.

6. In a calculating machine, a reversible, rotatable counting mechanism actuator, means for introducing values into the actuator, means for locking the actuator in neutral position, means operative by the introduction of a value into the actuator for moving the locking means to inoperative position, means adapted to be actuated by the rotation of the actuator in either direction for releasing the locking means, and selecting means for positioning the releasing means in or out of the path of movement of the release actuating means.

7. In a calculating machine, numeral wheels, a reversible rotary actuator therefor, means for stopping the actuator in neutral position including a latch, trigger means adapted to hold said latch disengaged and a rotatable element, rotatable synchronously with the actuator, arranged to trip said trigger upon rotation of the actuator.

8. In a calculating machine comprising settable differential mechanism and a plurality of latchable keys for controlling said mechanism; means for locking said differential mechanism against operation, means operable as an incident to the latching of a key for disabling said locking means, means for retaining said locking means disabled, and means operable in time with said mechanism for releasing said keys and said lock retaining means seriatim.

In testimony whereof, I have hereunto set my hand.

CARL M. F. FRIDEN.

CERTIFICATE OF CORRECTION.

Patent No. 1,818,548. Granted August 11, 1931, to

CARL M. F. FRIDEN.

It is hereby certified that error appears in the printed specification of the above numbered patent requiring correction as follows: Page 4, after line 23, insert the following paragraph "The latch 62 holds the nose 44 on the rocking arm 45, spaced from the periphery of the locking disc 39. When the latch 62 is raised, the arm 45 is freed and the nose 44 rides on the periphery of the locking disc. This inward movement of the arm 45 moves the pin 61 out of the range of the notch 63 so that the arm 45 is free to move to permit the nose 44 to drop into the notch in the stopping disc. The disc is released by rocking the arm 45 backward to again cause engagement of the latch 62 with the pin 61."; and that the said Letters Patent should be read with this correction therein that the same may conform to the record of the case in the Patent Office.

Signed and sealed this 8th day of December, A. D. 1931.

(Seal)

M. J. Moore,
Acting Commissioner of Patents.